United States Patent
Shen et al.

(10) Patent No.: US 10,666,148 B2
(45) Date of Patent: May 26, 2020

(54) DETECTING CURRENT MAGNITUDE AND DIRECTION IN A NON-ISOLATED DC/DC CONVERTER

(71) Applicant: Delta Electronics, Inc., Taoyuan (CN)

(72) Inventors: Guoqiao Shen, Taoyuan (CN); Jinfa Zhang, Taoyuan (CN)

(73) Assignee: Delta Electronics, Inc., Taoyuan, Taiwan (CN)

( * ) Notice: Subject to any disclaimer, the term of this patent is extended or adjusted under 35 U.S.C. 154(b) by 0 days.

(21) Appl. No.: 15/798,560

(22) Filed: Oct. 31, 2017

(65) Prior Publication Data

US 2018/0123447 A1    May 3, 2018

(30) Foreign Application Priority Data

Nov. 1, 2016 (CN) .......................... 2016 1 0935885

(51) Int. Cl.
*H02M 3/158* (2006.01)
*H02H 7/12* (2006.01)

(52) U.S. Cl.
CPC ........ *H02M 3/1588* (2013.01); *H02H 7/1213* (2013.01)

(58) Field of Classification Search
CPC ........... H02M 3/155–1588; H02M 2001/0009; H02H 7/1213
See application file for complete search history.

(56) References Cited

U.S. PATENT DOCUMENTS

| 6,426,612 B1 * | 7/2002 | Rozsypal ............ H02M 3/1588 323/282 |
| 7,714,558 B2 * | 5/2010 | Wu ........................ H02M 1/32 323/284 |
| 2005/0226298 A1 | 10/2005 | Asai |

(Continued)

FOREIGN PATENT DOCUMENTS

| CN | 102368685 A | 3/2012 |
| CN | 103094884 A | 5/2013 |

(Continued)

OTHER PUBLICATIONS

The CN1OA issued Mar. 1, 2019 by the CNIPA.
The CN2OA issued Aug. 6, 2019 by the CNIPA.

*Primary Examiner* — Jue Zhang
*Assistant Examiner* — Peter M Novak
(74) *Attorney, Agent, or Firm* — Yunling Ren

(57) ABSTRACT

A control method, which is applied to a conversion circuit including at least one bridge arm and an inductor, the bridge arm including an upper semiconductor switch and a lower semiconductor switch connected in series, and one end of the inductor being connected to a midpoint of the bridge arm, includes: judging a direction of current of the inductor when a scram event occurs in the conversion circuit; turning on the upper semiconductor switch and turning off the lower semiconductor switch when the direction of current of the inductor is judged as a first direction, wherein the first direction is a forward conduction direction of the lower semiconductor switch; and turning off the upper semiconductor switch and turning on the lower semiconductor switch when the direction of current of the inductor is judged as a second direction.

4 Claims, 12 Drawing Sheets

(56) References Cited

U.S. PATENT DOCUMENTS

| | | | | |
|---|---|---|---|---|
| 2013/0114307 | A1* | 5/2013 | Fang | H02M 1/32 363/21.01 |
| 2016/0306371 | A1* | 10/2016 | Svorc | H02M 3/1588 |
| 2016/0373002 | A1* | 12/2016 | Borfigat | H02M 1/32 |
| 2017/0133936 | A1* | 5/2017 | De Vries | H02M 3/1563 |
| 2017/0187278 | A1* | 6/2017 | Yamaguchi | H02M 1/088 |

FOREIGN PATENT DOCUMENTS

| | | |
|---|---|---|
| CN | 105529677 A | 4/2016 |
| WO | 2016035120 A1 | 3/2016 |

\* cited by examiner

DETECTING CURRENT MAGNITUDE AND DIRECTION IN A NON-ISOLATED DC/DC CONVERTER

CROSS REFERENCE

This application is based upon and claims priority to Chinese Patent Application No. 201610935885.3, filed on Nov. 1, 2016, the entire contents thereof are incorporated herein by reference.

TECHNICAL FIELD

The present disclosure relates to the field of power electronic technologies, and more particularly, to a control method and a control device applied to a conversion circuit.

BACKGROUND

With the development of electronic technologies, power conversion circuits are increasingly widely used. For example, referring to FIG. 1, a traditional power conversion circuit 100 includes an upper switch G1, a lower switch G2, an inductor L, a load resistor R1 and capacitors C1, C2 and C3. When the circuit normally works, the upper switch G1 and the lower switch G2 are turned on complementarily.

For a power conversion circuit similar to what is shown in FIG. 1, when a scram event such as overcurrent, overvoltage and overheat protection occurs, in the traditional protection method, the upper switch and the lower switch are turned off no matter what the direction of current is.

When the switch is a reverse conducting-type semiconductor switch such as a silicon carbide MOSFET, a parasitic reverse diode therein generally has a relatively high conduction voltage drop; and when a large reverse current flows through the parasitic reverse diode, a great power loss will be generated. Therefore, if a freewheel current of the inductor reversely flows through the parasitic diode of either of the upper switch and the lower switch, the parasitic diode may suffer from relatively large power loss and thermal stress, and even will be burnt in a severe case.

For this reason, one solution generally adopted is to reversely connect a high-performance diode in parallel to the switch. As the conduction voltage drop of the diode is relatively low, the reverse current will flow through the diode, so that the parasitic diode is prevented from generating reverse conducting loss and thermal stress when the switch is turned off. However, using this method may additionally increase material cost and manufacturing cost. In addition, another solution generally adopted is to employ a semiconductor switch with a larger current specification, and also a highly sensitive protective detection circuit is provided, so that when a circuit or system break down, a control circuit proceeds a rapid detection and a protective action is triggered to turn off the semiconductor switch as early as possible, thereby avoiding the problem of severe occurrence of overcurrent or overheat. However, using this method may enhance requirements for protection and detection circuits and costs of the semiconductor switches. Therefore, it is still required to develop a method giving consideration to normal operation and scram protection of the power conversion circuit and limiting thermal stress.

It is to be noted that the above information disclosed in this Background section is only for enhancement of understanding of the background of the present disclosure and therefore it may contain information that does not form the prior art that is already known to a person of ordinary skill in the art.

SUMMARY

An objective of the present disclosure is to provide a control method and a control device applied to a conversion circuit to overcome, at least to a certain extent, one or more problems caused by limitation and defects of related technologies.

According to a first aspect of an embodiment of the present disclosure, there is provided a control method, which is applied to a conversion circuit. The conversion circuit includes at least one bridge arm and an inductor. The bridge arm includes an upper semiconductor switch and a lower semiconductor switch connected in series, and one end of the inductor is connected to a midpoint of the bridge arm. The control method includes: judging a direction of current of the inductor in the conversion circuit when a scram event occurs in the conversion circuit; turning on the upper semiconductor switch and turning off the lower semiconductor switch when the direction of current of the inductor is judged as a first direction, wherein the first direction is a forward conduction direction of the lower semiconductor switch; and turning off the upper semiconductor switch and turning on the lower semiconductor switch when the direction of current of the inductor is judged as a second direction, wherein the second direction is a forward conduction direction of the upper semiconductor switch.

According to a second aspect of the embodiment of the disclosure, there is provided a control device, which is applied to a conversion circuit. The conversion circuit includes at least one bridge arm and an inductor. The bridge arm includes an upper semiconductor switch and a lower semiconductor switch connected in series, and one end of the inductor is connected to a midpoint of the bridge arm. The control device includes: a current managing unit, configured to judge a direction of current of the inductor in the conversion circuit when a scram event occurs in the conversion circuit; a drive control unit, configured to turn on the upper semiconductor switch and turn off the lower semiconductor switch when the direction of current of the inductor is judged as a first direction, and turn off the upper semiconductor switch and turn on the lower semiconductor switch when the direction of current of the inductor is judged as a second direction. The first direction is a forward conduction direction of the lower semiconductor switch, and the second direction is a forward conduction direction of the upper semiconductor switch.

According to the present disclosure, by arranging a current managing unit to detect the direction and the magnitude of the freewheel current of the inductor in the conversion circuit when the semiconductor switch converter scrams, and by reasonably setting conduction and turn-off of the upper semiconductor switch and the lower semiconductor switch in the conversion circuit when a scram event occurs, the freewheel current generated by the scram event is outputted successfully in the direction of current thereof, and neither power loss nor thermal stress is generated because the reverse current thereof does not flow through the parasitic diode of the semiconductor switch. Therefore, the present disclosure may prevent the parasitic diode of the semiconductor switch from suffering relatively large reverse current and conduction loss in the a scram event, control the generation of the thermal stress, and protect the semiconductor switch to operate safely and turn off the semiconductor switch in the scram event.

It is to be understood that both the foregoing general description and the following detailed description are exemplary and explanatory only and are not restrictive of the present disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
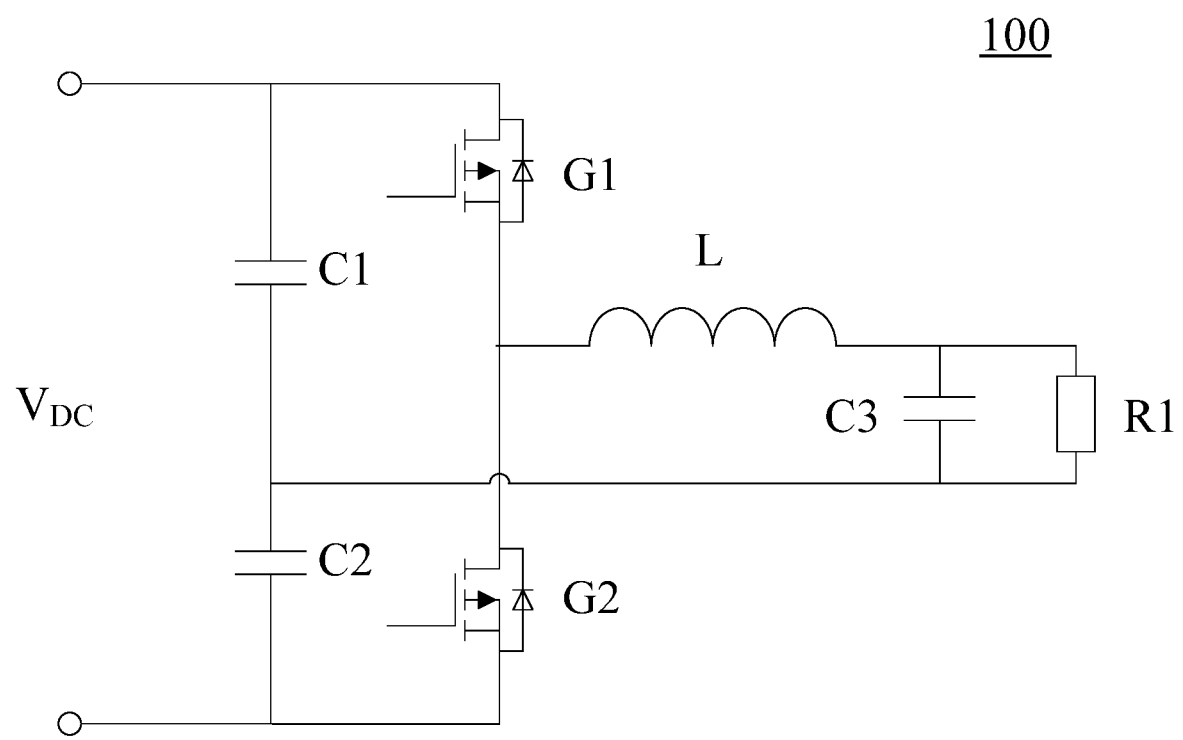
FIG. 1 schematically illustrates a schematic diagram of a conversion circuit.

Exemplary embodiments will be described more comprehensively by referring to accompanying drawings. However, the exemplary embodiments can be embodied in many forms and should not be construed as limited to the embodiments set forth herein; rather, these embodiments are provided so that this disclosure will be made thorough and complete, and the concept of exemplary embodiments will be fully conveyed to those skilled in the art. Furthermore, the described features, structures, or characteristics may be combined in any suitable manner in one or more embodiments. In the following description, numerous specific details are provided to provide a thorough understanding of the embodiments of the disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the disclosure.

Furthermore, the accompanying drawings are merely schematic illustrations of the present disclosure. Same or similar parts are denoted by same reference numbers in the drawings and, thus, a detailed description thereof will be omitted. Some block diagrams shown in the figures are functional entities and not necessarily to be corresponding to a physically or logically individual entities. These functional entities may be implemented in a form of software, or implemented in one or more hardware units or integrated circuits, or implemented in different networks and/or processor devices and/or microcontroller devices.

A detailed description of the exemplary embodiments of the present disclosure will be made in the following with reference to the accompanying drawings.

Figure 2A:
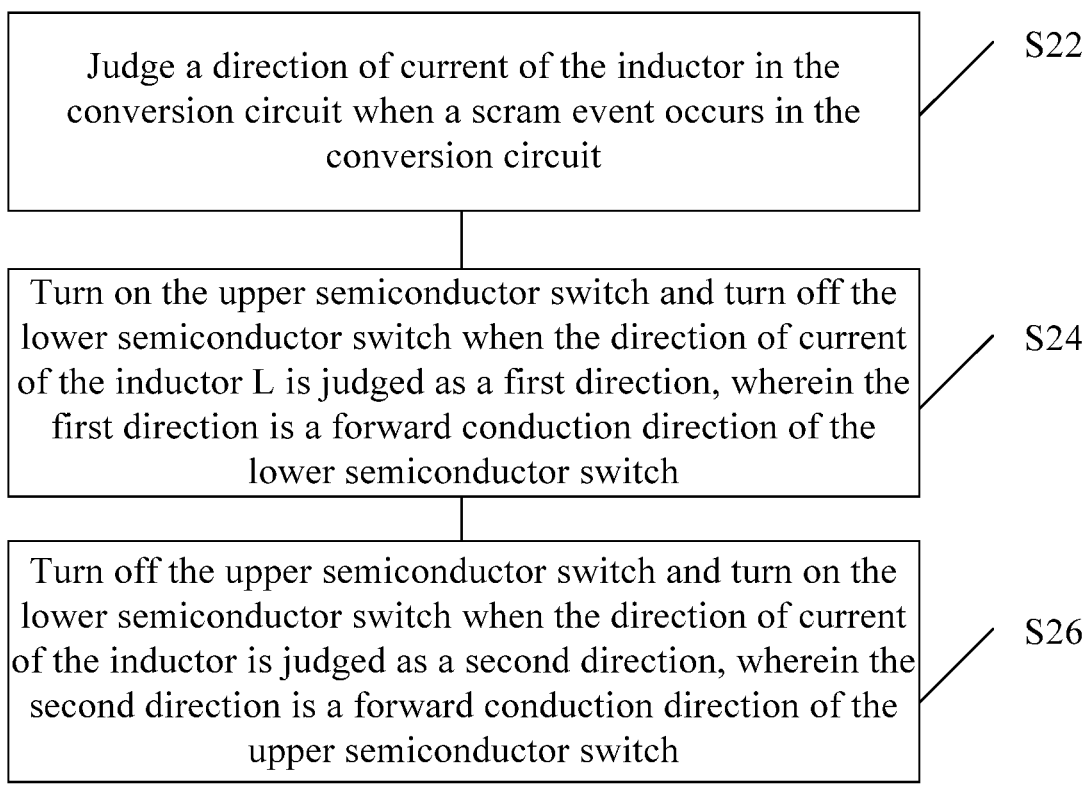
FIG. 2A schematically illustrates a flowchart of a control method according to an exemplary embodiment of the present disclosure.

FIG. 2A schematically illustrates a flowchart of a control method according to an exemplary embodiment of the present disclosure;

In this exemplary embodiment, at first there is provided a control method, which is applied to a conversion circuit, for example, a conversion circuit as shown in FIG. 1. The conversion circuit includes at least one bridge arm and an inductor L. The bridge arm includes an upper semiconductor switch G1 and a lower semiconductor switch G2 connected in series, and one end of the inductor L is connected to a midpoint of the bridge arm. When the circuit runs normally, the upper semiconductor switch G1 and the lower semiconductor switch G2 may be complementarily controlled.

Referring to FIG. 2A, in S22, a direction of current of the inductor L in the conversion circuit is judged when a scram event occurs in the conversion circuit.

When an abnormal condition such as overvoltage, overcurrent and overheat occurs in the power system, it is necessary to stop the conversion circuit imminently. As hereinafter described, this condition is referred to as a scram event. When the scram event occurs, as the conversion circuit is running, a current I flows through the inductor L. As can be known from principles of the conversion circuit, the direction of current I may be a forward conduction direction D1 of the lower semiconductor switch G2, or may be a forward conduction direction D2 of the upper semiconductor switch G1. The forward conduction direction herein is a direction in which the current flows through the semiconductor switch when the semiconductor switch is turned on by driving circuit. If the scram event occurs, the conversion circuit needs to stop running imminently, but the current I does not disappear immediately due to presence of the inductor L, and thus there exists a freewheel current. The semiconductor switch whose forward conduction direction is similar with the direction of current I is turned off at this moment. To prevent the reverse parasitic diode of the semiconductor switch from generating the thermal stress by the reverse current, the current I may be outputted by the other semiconductor switch. There may be many methods for judging the direction of current, for instance, judging by means of a hardware circuit, or judging by combining a software program with the hardware circuit, which is not specifically limited in this exemplary embodiment.

In S24, the upper semiconductor switch G1 is turned on and the lower semiconductor switch G2 is turned off when the direction of current of the inductor L is judged as a first direction, wherein the first direction is a forward conduction direction of the lower semiconductor switch G2.

In the event of a scram event, when the direction of current I is the forward conduction direction of the lower semiconductor switch G2, that is, when the current I flows from the inductor L to the midpoint of the bridge arm, the lower semiconductor switch G2 may be turned off and simultaneously the upper semiconductor switch G1 may be turned on, so that the current I flows out from the upper semiconductor switch G1. In this way, the reverse current suffered by the reverse parasitic diode of the lower semiconductor switch G2 is reduced, thereby achieving the effect of protecting the semiconductor switches.

In S26, the upper semiconductor switch G1 is turned off and the lower semiconductor switch G2 is turned on when the direction of current of the inductor L is judged as a second direction, wherein the second direction is a forward conduction direction of the upper semiconductor switch G1.

Similarly, in the event of a scram event, when the direction of current I is judged as the forward conduction direction of the upper semiconductor switch G1, that is, when the current I flows from the midpoint of the bridge arm to the inductor L, the upper semiconductor switch G1 may be turned off and simultaneously the lower semiconductor switch G2 may be turned on, so that the current I flows out from the lower semiconductor switch G2. In this way, the reverse current suffered by the reverse parasitic diode of the upper semiconductor switch G1 is reduced, thereby achieving the effect of protecting the semiconductor switches.

In addition, after the current is reduced to a smaller magnitude of current, the loss and thermal stress suffered by the parasitic diode of the semiconductor switch is limited even though the semiconductor switch is turned on. At this moment, each semiconductor switch in the bridge arm may be turned off.

According to some embodiments, when a scram event occurs in the conversion circuit, the upper semiconductor switch and the lower semiconductor switch may be turned off if the magnitude of current of an inductor current I does not meet a presupposed condition. The presupposed condition may be that an absolute value of the magnitude of current of the inductor which is greater than a threshold.

According to some embodiments, the value of the threshold is not smaller than a maximum measurement tolerance of the inductor current to avoid a false judgment of the result, but the present disclosure is not limited thereto. In a practical engineering application, the maximum measurement tolerance generally does not exceed several percent points (for example, 5%) of a rated current.

In this exemplary embodiment, by judging the direction of current outputted by the conversion circuit when the scram event occurs, the upper semiconductor switch and the lower semiconductor switch of the bridge arm of the conversion circuit are turned on and off selectively. In this way, the reverse current suffered by the reverse parasitic diode of the semiconductor switches is reduced, thereby achieving the effect of protecting the semiconductor switches.

Figure 2B:
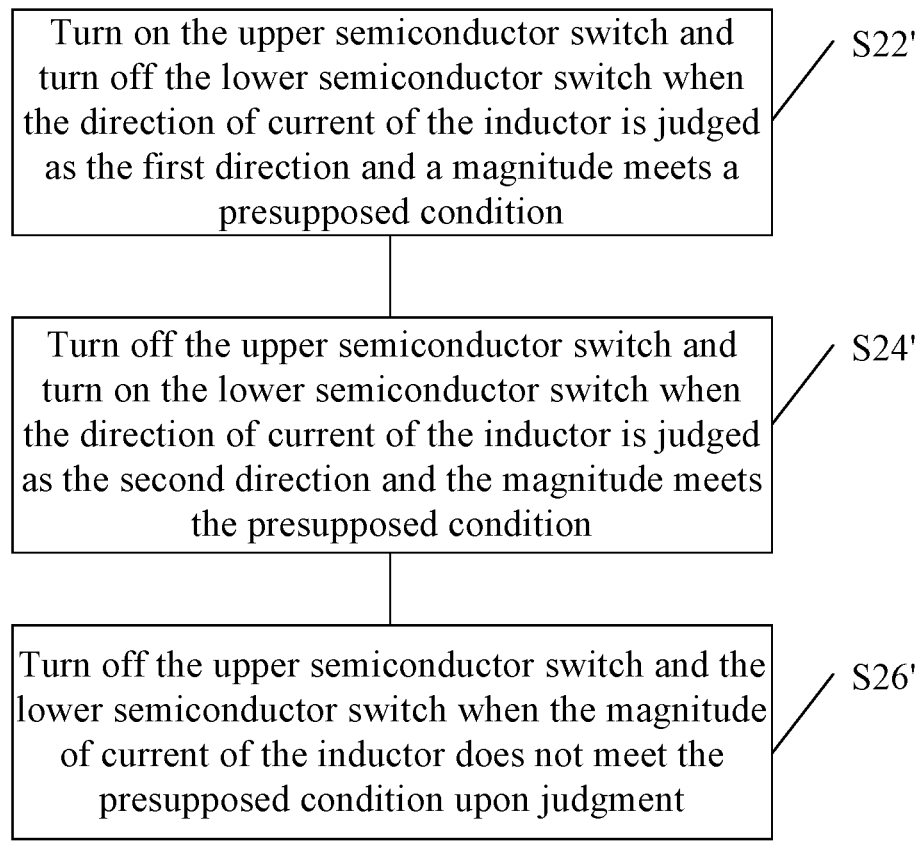
FIG. 2B schematically illustrates a flowchart of a control method according to an exemplary embodiment of the present disclosure.

FIG. 2B schematically illustrates a control method according to another embodiment of the present disclosure.

Referring to FIG. 2B, in S22', the upper semiconductor switch G1 is turned on and the lower semiconductor switch G2 is turned off when the direction of current of the inductor L is judged as the first direction and a magnitude meets a presupposed condition.

The method for judging the magnitude of current may be by means of a hardware circuit, or by combining a software program with the hardware circuit. In other embodiments of the present disclosure, judging the magnitude of current and judging the direction of current may be performed in the same way at the same moment or performed respectively.

According to some embodiments, when the current I meets this presupposed condition, the current I is steered according to the direction of current I. That is, when the direction of current I is judged as the forward conduction direction of the lower semiconductor switch G2, namely when the current I flows in from the inductor L to the midpoint of the bridge arm, it is selected to turn the upper semiconductor switch G1 on, so that the current I flows out from the upper semiconductor switch G1. In this way, the reverse current suffered by the reverse parasitic diode of the lower semiconductor switch G2 is reduced, thereby achieving the effect of protecting the lower semiconductor switch.

In S24', the upper semiconductor switch G1 is turned off and the lower semiconductor switch G2 is turned on when the direction of current of the inductor L is judged as the second direction and the magnitude meets the presupposed condition.

According to some embodiments, when the current I meets this presupposed condition, the current I is steered according to the direction of current I. That is, when the direction of current I is judged as the forward conduction direction of the upper semiconductor switch G1, namely when the current I flows from the midpoint of the bridge arm to the inductor L, it is selected to turn the lower semiconductor switch G2 on, so that the current I flows out from the lower semiconductor switch G2. In this way, the reverse current suffered by the reverse parasitic diode of the upper semiconductor switch G1 is reduced, thereby achieving the effect of protecting the upper semiconductor switch.

In S26', the upper semiconductor switch G1 and the lower semiconductor switch G2 are turned off when the magnitude of current of the inductor L does not meet the presupposed condition upon judgment.

The presupposed condition may be that an absolute value of the magnitude of current I which is greater than a threshold. That is, whichever the direction of current I is, the upper semiconductor switch G1 and the lower semiconductor switch G2 may be directly turned off simultaneously as long as the magnitude of current is smaller than this threshold. At this moment, the current I is small, thus the reverse current is also small, and the generated thermal stress of the reverse parasitic diode of the semiconductor switch is also small. Therefore, no serious damage is caused to the semiconductor switch.

In addition, when the current I is greater than this threshold, the upper semiconductor switch or the lower semiconductor switch is turned on, so that the reverse current of the current I is discharged. When the magnitude of current I is reduced to be within the threshold, the upper semiconductor switch and the lower semiconductor switch in the bridge arm are turned off simultaneously, so that the circuit enters a protection stop state.

It is to be noted that the above accompanying drawings are merely illustrative description of processes included in the method according to the exemplary embodiments of the present disclosure and are not intended to limit the present disclosure. It is easy to understand that the processes shown in the above accompanying drawings do not indicate or limit time sequences of these processes. Furthermore, it is also easy to understand that these processes may be executed, for example, synchronously or asynchronously in a plurality of modules.

Corresponding to the above control method, this exemplary embodiment also provides a control device, which is applied to a conversion circuit, for example, the conversion circuit as shown in FIG. 1.

Figure 3:
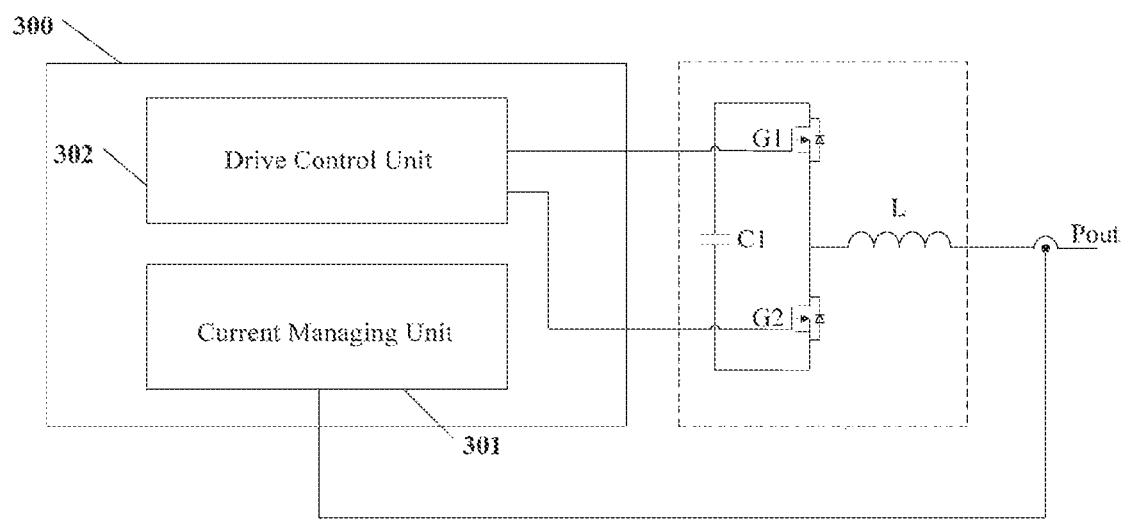
FIG. 3 schematically illustrates a block diagram of a control device according to an exemplary embodiment of the present disclosure.

FIG. 3 schematically illustrates a block diagram of a control device according to an exemplary embodiment of the present disclosure.

Referring to FIG. 3, the control device 300 may include a current managing unit 301 and a drive control unit 302.

The current managing unit 301 may be configured to judge the direction of current of the inductor L in the conversion circuit when a scram event occurs in the conversion circuit. Judging the direction of the inductor current I may either be implemented via hardware or be implemented by matching a software program with a hardware circuit.

The drive control unit 302 may be configured to turn on the upper semiconductor switch G1 and turn off the lower semiconductor switch G2 when the direction of current of the inductor L is judged as a first direction, and turn off the upper semiconductor switch G1 and turn on the lower semiconductor switch G2 when the direction of current of the inductor L is judged as a second direction. The first direction is a forward conduction direction of the lower semiconductor switch G2, and the second direction is a forward conduction direction of the upper semiconductor switch G1. In this case, the drive control unit 302 may be configured to execute the control method as previously mentioned and turn on/off the two semiconductor switches.

According to some embodiments, the current managing unit 301 is further configured to detect a magnitude of current of the inductor L in the conversion circuit when a scram event occurs in the conversion circuit. The drive control unit 302 is further configured to turn off the upper semiconductor switch G1 and the lower semiconductor switch G2 when the current managing unit 301 detects the magnitude of current of the inductor L does not meet a presupposed condition.

According to some embodiments, the current managing unit 301 is configured to detect the magnitude of current and the direction of current of the inductor in the conversion circuit when a scram event occurs in the conversion circuit. Meanwhile, when the current managing unit needs to detect the magnitude of current and the direction of current simultaneously, the drive control unit 302 is configured to turn on the upper semiconductor switch G1 and turn off the lower semiconductor switch G2 when the direction of current of the inductor L is judged as the first direction D1 and the magnitude meets a presupposed condition, turn off the upper semiconductor switch G1 and turn on the lower semiconductor switch G2 when the direction of current of the inductor L is judged as the second direction D2 and the magnitude meets the presupposed condition, and turn off the upper semiconductor switch G1 and the lower semiconductor switch G2 when the magnitude of current of the inductor does not meet the presupposed condition upon judgment.

The presupposed condition may be that an absolute value of the magnitude of current I which is greater than a threshold. Of course, the presupposed condition may be other settings of the magnitude of current fit for practical situations.

The control device 300 may be implemented by a hardware circuit or by matching a software program with the hardware circuit. This exemplary embodiment first provides a hardware circuit scheme that may implement the control device 300 to match up with the conversion circuit to work.

Figure 4A:
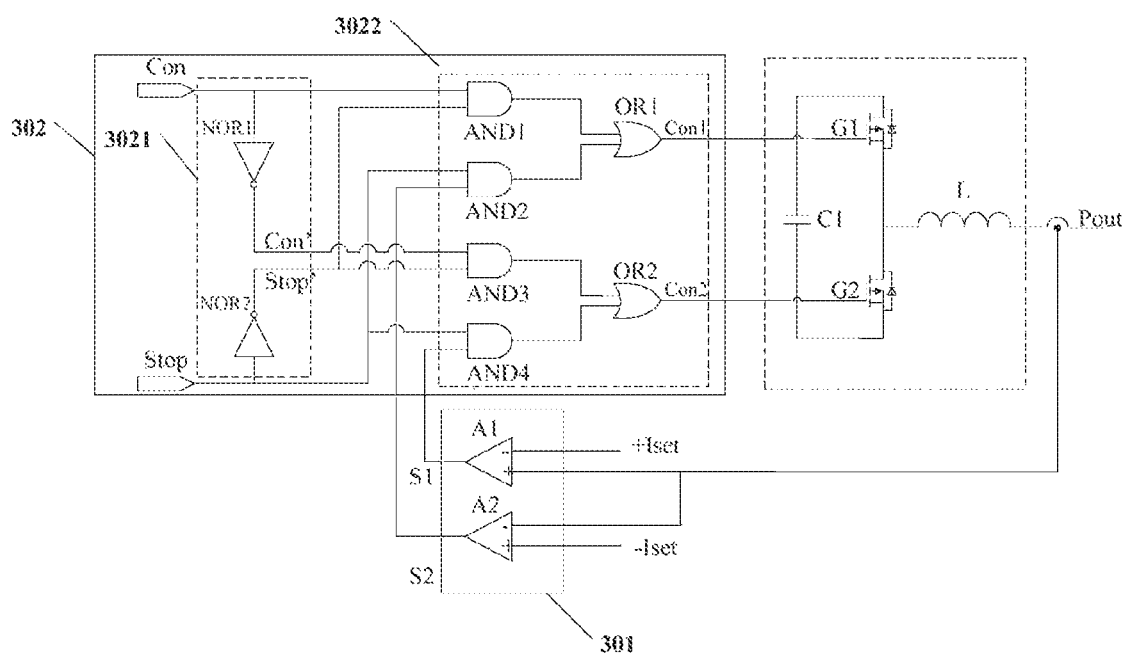
FIG. 4A schematically illustrates a circuit diagram of a control device according to an exemplary embodiment of the present disclosure.

FIG. 4A illustrates a detailed circuit diagram of a control device according to an embodiment of the present disclosure. The detailed circuit diagram of the control device as shown in FIG. 4A may be configured to implement the control device 300 as shown in FIG. 3.

Referring to FIG. 4A, the conversion circuit includes at least one bridge arm and an inductor L. the bridge arm includes an upper semiconductor switch G1 and a lower semiconductor switch G2 connected in series, and one end of the inductor L is connected to a midpoint of the bridge arm. When the circuit runs normally, the upper semiconductor switch G1 and the lower semiconductor switch G2 may be complementarily conduction. The inductor has a current input end (not shown) electrically connecting the midpoint of the bridge arm and a current output end Pout.

Referring to FIG. 4A, the control device 300 may be divided into two parts, namely a current managing unit 301 and a drive control unit 302. According to the circuit diagram, the current managing unit 301 may include a first comparator A1 and a second comparator A2. As shown in FIG. 4, a positive input end of the first comparator A1 is electrically connected to the current output end Pout of the inductor L, and a negative input end thereof is electrically connected to a first reference current +Iset. The first comparator A1 may be configured to compare a current I of the inductor L with the first reference current +Iset and output a first current comparison signal S1. A negative input end of the second comparator A2 is electrically connected to the current output end Pout of the inductor L, and a positive input end thereof is electrically connected to a second reference current −Iset. The second comparator A2 may be configured to compare the current of the inductor with the second reference current −Iset and output a second current comparison signal S2.

When the direction of current I is the first direction D1, i.e., the forward conduction direction of the lower semiconductor switch, the current I flows from the inductor L to the midpoint of the bridge arm. At this moment, the second comparator A2 works, compares the current I with the magnitude of the second reference current −Iset, and outputs the second current comparison signal S2. When the direction of current I is the second direction D2, i.e., the forward conduction direction of the upper semiconductor switch, the current I flows from the midpoint of the bridge arm to the inductor L. At this moment, the first comparator A1 works, compares the current I with the magnitude of the first reference current +Iset, and outputs the first current comparison signal S1.

When the control device 300 only needs to judge the direction of current, both the first reference current and the second reference current may be set to zero, or the negative input end of the first comparator A1 and the positive input end of the second comparator A2 are grounded. However, in practical engineering application, the first reference current and the second reference current may be set to values greater than the maximum measurement tolerance to reduce the effect of the measurement tolerance on the judgment result.

For ease of setting, the first reference current and the second reference current may be opposite in direction and have magnitudes whose absolute value is equal to a threshold, for example, +Iset and −Iset. The value of the Iset may be not smaller than the maximum measurement tolerance of the inductor current to reduce the possibility of false judgment. In the actual engineering application, the maximum measurement tolerance is merely several percent points of a rated current, which generally is not more than 5% of the rated current. Therefore, within such a small current magnitude range, the loss and thermal stress suffered by the parasitic diode of the semiconductor switch when being turned on are quite limited and thus is affordable.

In addition, if it is required to simultaneously judge the direction of current and the magnitude of current, the first reference current and the second reference current also may be other values that can implement judgment of the direction of current and the magnitude of current. For example, the first reference current and the second reference value may be opposite in direction and have magnitudes whose absolute value is equal to a threshold Iset, wherein the value of the Iset may be, for example, 200% of a maximum deviation between a current sensor and a whole measuring circuit, which is not specifically limited by the exemplary embodiment.

According to another part of the circuit diagram of the control device 300, the drive control unit 302 may include a signal inverting circuit 3021 and a control signal generating circuit 3022.

The signal inverting circuit 3021 may be configured to receive an original control signal Con and output an inversion signal Con' of the original control signal Con, and receive a scram signal Stop and output an inversion signal Stop' of the scram signal Stop. According to a specific implementation, the signal inverting circuit 3021 may include two NOT logic gates, either of which includes an input end and an output end. Referring to FIG. 4, the input end of the first NOT logic gate NOR1 is electrically connected to the original control signal Con and is configured to receive the original control signal Con and output the inversion signal Con' of the original control signal Con. The input end of the second NOT logic gate NOR2 is electrically connected to the scram signal Stop and is configured to receive the scram signal Stop and output the inversion signal Stop' of the scram signal Stop.

The control signal generating circuit 3022 may be configured to output a first control signal Con1 corresponding to the upper semiconductor switch according to the original control signal Con, the scram signal Stop, the inversion signal Stop' of the scram signal and the second current comparison signal S2, and output a second control signal Con2 corresponding to the lower semiconductor switch according to the inversion signal Con' of the original control signal, the scram signal Stop, the inversion signal Stop' of the scram signal and the first current comparison signal S1.

Referring to FIG. 4A, the control signal generating circuit 3022 may include four AND logic gates and two OR logic gates. The AND logic gate or the OR logic gate has a first input end, a second input end and an output end. The first input end of the first AND logic gate AND1 is electrically connected to the original control signal Con, and the second input end thereof is electrically connected to the output end of the second NOT logic gate NOR2, to receive the original control signal Con and the inversion signal Stop' of the scram signal and output a first output signal. The first input end of the second AND logic gate AND2 is electrically connected to the scram signal Stop, and the second input end thereof is electrically connected to the output end of the second comparator A2, to receive the scram signal Stop and the second current comparison signal S2 and output a second output signal. The first input end of the first OR logic gate OR1 is electrically connected to the output end of the first AND logic gate AND1, and the second input end thereof is electrically connected to the output end of the second AND logic gate AND2, to receive the first output signal and the second output signal and output the first control signal Con1.

The first input end of the third AND logic gate AND3 is electrically connected to the output end of the first NOT logic gate NOR1, and the second input end thereof is electrically connected to the output end of the second NOT logic gate NOR2, to receive the inversion signal Con' of the original control signal and the inversion signal Stop' of the scram signal and output a third output signal. The first input end of the fourth AND logic gate AND4 is electrically connected to the scram signal Stop, and the second input end thereof is electrically connected to the output end of the first comparator A1, to receive the scram signal Stop and the first current comparison signal S1 and output a fourth output signal. The first input end of the second OR logic gate OR2 is electrically connected to the output end of the third AND logic gate AND3, and the second input end thereof is electrically connected to the output end of the fourth AND logic gate AND4, to receive the third output signal and the fourth output signal and output the second control signal Con2.

Figure 4B:
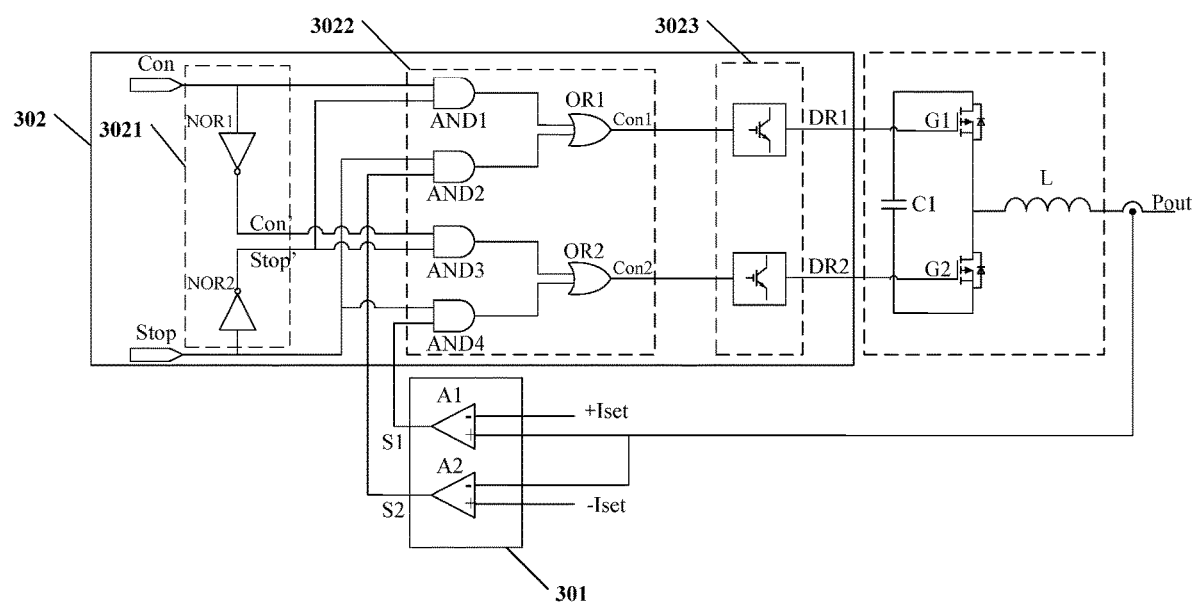
FIG. 4B schematically illustrates a circuit diagram of a control device according to an exemplary embodiment of the present disclosure.

According to some embodiments, the drive control unit 302 may further include a semiconductor switch driving circuit 3023. Referring to FIG. 4B, the semiconductor switch driving circuit 3023 may be electrically connected to the control signal generating circuit 3022, and the first control signal Con1 and the second control signal Con2 pass through the semiconductor switch driving circuit 3023 to generate a first drive signal DR1 driving the upper semiconductor switch G1 and a second drive signal DR2 driving the lower semiconductor switch G2.

Figure 4C:
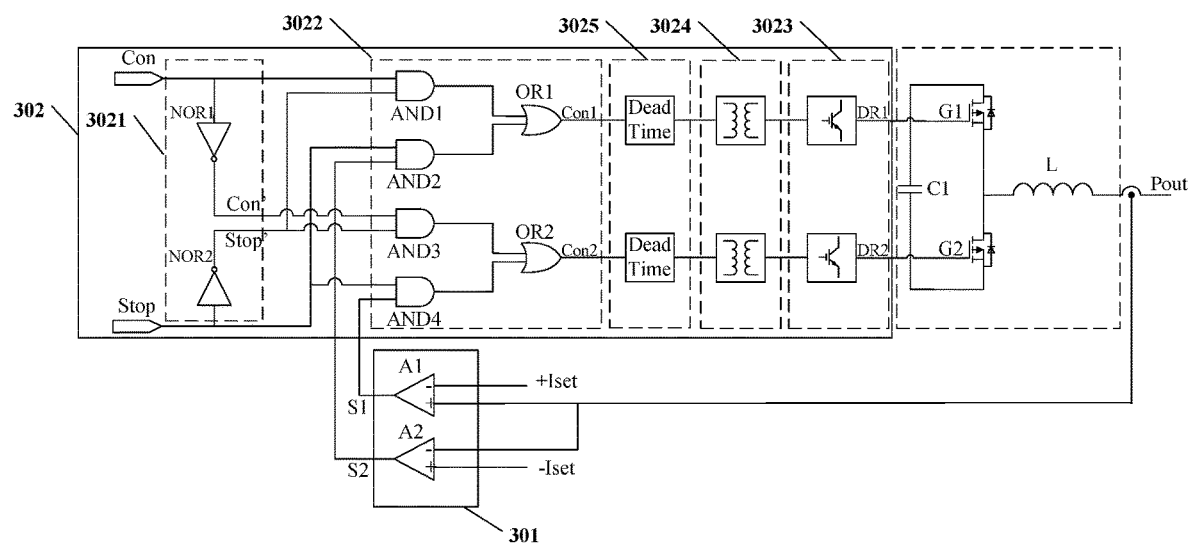
FIG. 4C schematically illustrates a circuit diagram of a control device according to an exemplary embodiment of the present disclosure.

According to some embodiments, as shown in FIG. 4C, the control signal generating circuit 3022 may be cascade-connected to a dead time generating circuit 3025, the dead time generating circuit 3025 may be cascade-connected to an isolating circuit 3024, and the isolating circuit 3024 may be cascade-connected to a semiconductor switch driving circuit 3023. The semiconductor switch driving circuit 3023 generates a first drive signal DR1 driving the upper semiconductor switch G1 and a second drive signal DR2 driving the lower semiconductor switch G2. The dead time generating circuit 3025 generally is a necessary element for complementarily conduction of two semiconductor switches. The isolating circuit 3024 is configured to enable the control signal generating circuit to transmit a semiconductor switch command to the driving circuits with different levels. The semiconductor switch driving circuit 3023 is configured to drive the semiconductor switches to act according to requirements of the semiconductor switch command. The above three parts are designed according to a universal principle of a voltage source semiconductor switch conversion circuit.

Figure 5A:
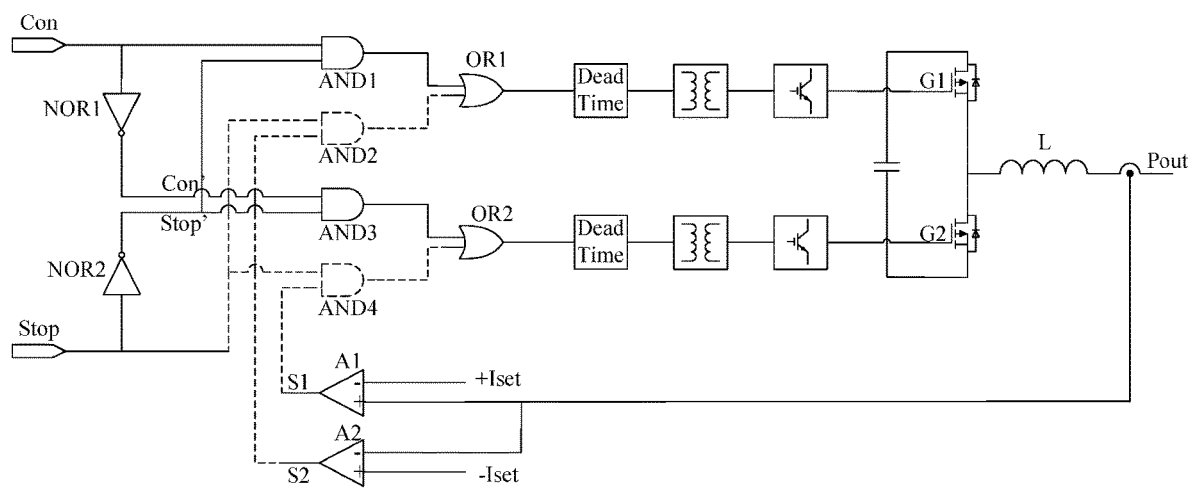
FIG. 5A schematically illustrates an equivalent circuit diagram of a control device in proper operation according to an exemplary embodiment of the present disclosure.
Figure 5B:
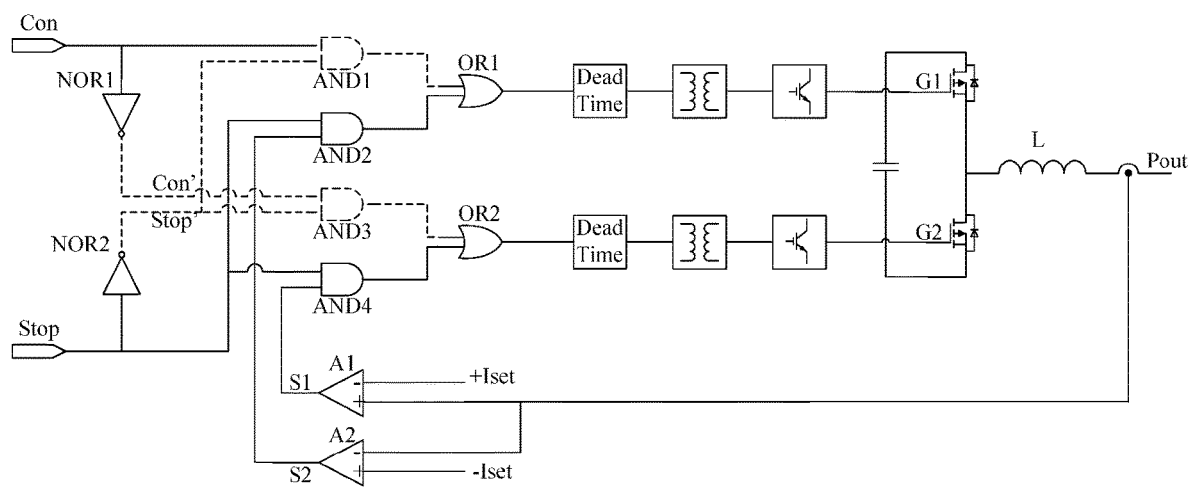
FIG. 5B schematically illustrates an equivalent circuit diagram of a control device in the event of a scram event according to an exemplary embodiment of the present disclosure.

FIG. 5A and FIG. 5B are equivalent circuit diagrams when the control device 300 under normal operation and when a scram event occurs respectively. In the figures, the dotted portion indicates that this portion does not act. Referring to FIG. 5A, when no scram event occurs, neither the second AND logic gate AND2 nor the fourth AND logic gate AND4 acts, and the upper semiconductor switch G1 and the lower semiconductor switch G2 are complementarily conduction under the action of the original control signal Con. Referring to FIG. 5B, when a scram event occurs, neither the first AND logic gate AND1 nor the third AND logic gate AND3 acts. Conduction and turn-off of the upper semiconductor switch G1 and the lower semiconductor switch G2 are controlled under the original control signal Con and the scram signal Stop. When the above signals may be represented by a logic variable "0" or "1", for example, the scram signal Stop=1 when the event of a scram event occurs, the scram signal Stop=0 in the normal operation, and a logic having the above action may be as shown in the following expression.

$$\begin{cases} Con1 = Stop'1\ Con + Stop1\ S2 \\ Con2 = Stop'1\ Con + Stop1\ S1 \end{cases}$$

The above expression indicates a fact that when the scram event occurs, the semiconductor switch G2 needs a flywheel current if the inductor has a larger forward current (S1=1). Therefore, to prevent the parasitic diode from being turned on, it is required to apply a gate driving voltage to the semiconductor switch G2, namely Con2=1. The semiconductor switch G1 needs a flywheel current if the inductor has a larger negative current (S2=1). Therefore, to prevent the parasitic diode from being turned on, it is required to apply a gate driving voltage to the semiconductor switch G1, namely Con1=1.

In other embodiments of the present disclosure, it also may be represented as Stop=0 when the event of a scram event occurs and Stop=1 in the normal operation. In this case, the logic having the above action may be represented by the following Expression II:

$$\begin{cases} Con1 = Stop1\ Con + Stop'1\ S2 \\ Con2 = Stop1\ Con + Stop'1\ S1 \end{cases}$$

In addition to the implementation by the above hardware circuit, the control device 300 also may be implemented by matching a software program with the hardware circuit. For example, according to one embodiment, implementation of function of the control device 300 may be implemented by means of a digital signal processor (DSP).

Figure 6:
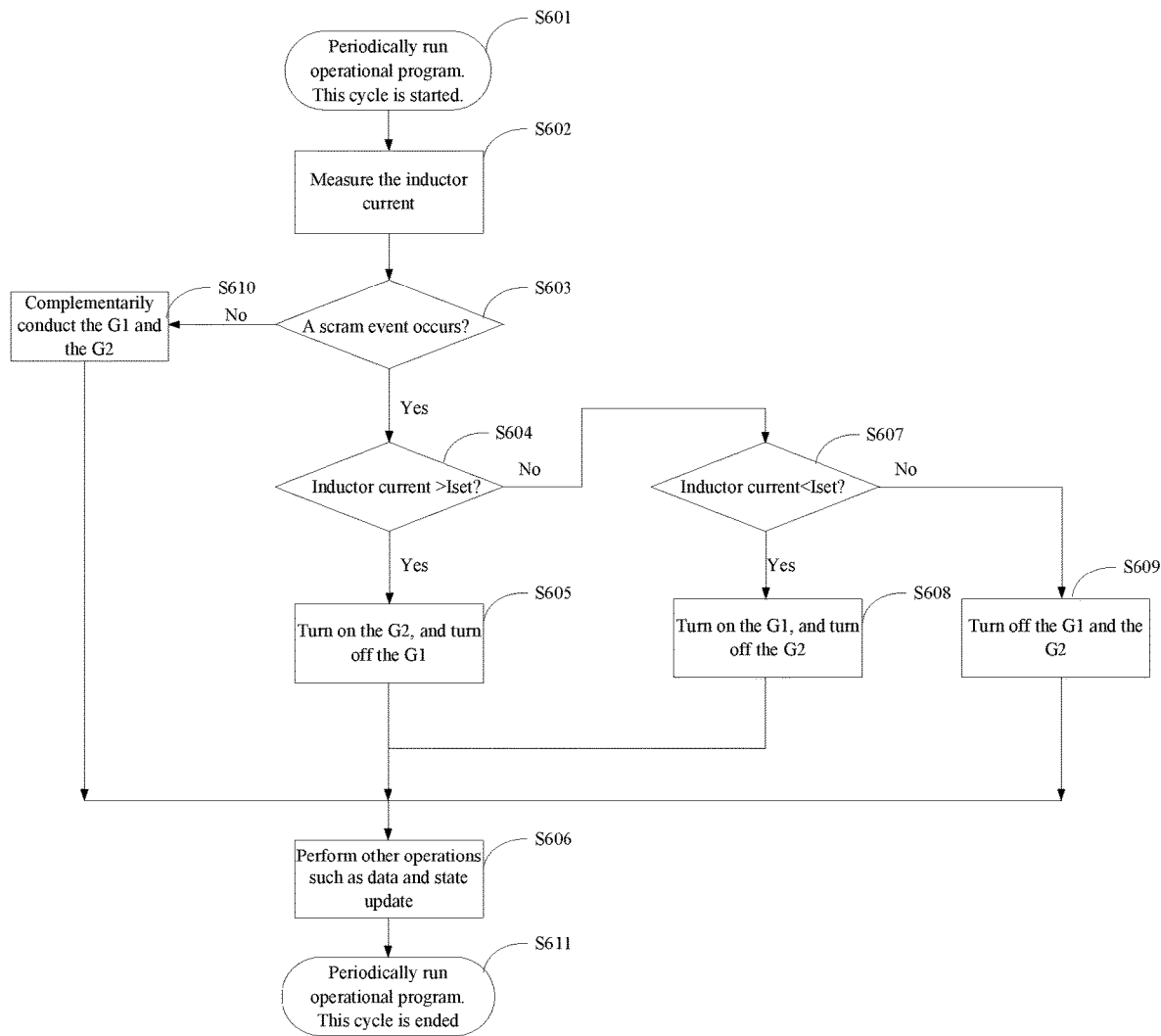
FIG. 6 schematically illustrates a flowchart of software implementing functions of the control device according to an exemplary embodiment of the present disclosure.

FIG. 6 illustrates a flowchart of software implementing functions of the control device 300 as shown in FIG. 4 according to an exemplary embodiment of the present disclosure.

Referring to FIG. 6, the software program is a periodically running operational program (S601). When the cycle is started, the current I is measured first (S602) and then it is judged whether a scram event occurs (S603). If the scram event occurs, it is judged whether the magnitude of current is greater than a threshold (Iset) of the magnitude of forward current (S604). If so, the upper semiconductor switch G1 is turned off, the lower semiconductor switch G2 is turned on (S605), and other operations such as data and state update are performed (S606). Otherwise, it is judged whether the magnitude of current is smaller than a threshold of a magnitude of negative current (S607). If so, the upper semiconductor switch G1 is turned on and the lower semiconductor switch G2 is turned off (S608), and other operations such as data and state update are performed (S606). Otherwise, both the upper semiconductor switch and the lower semiconductor switch are turned off (S609), so that the circuit enters a scram state, and the other operations such as data and state update are performed (S606). If no scram event occurs upon judgment, the upper semiconductor switch and the lower semiconductor switch are continuously controlled to operate normally and to be conduct complementarily (S610), and the other operations such as data and state update are performed (S606). After the other operations such as data and state update are performed, this cycle is ended (S611).

In addition to being applied to the conversion circuit in FIG. 1, the control device 300 also may be applied to a multilevel converter including a bridge arm having a complementary semiconductor switch.

Figure 7:
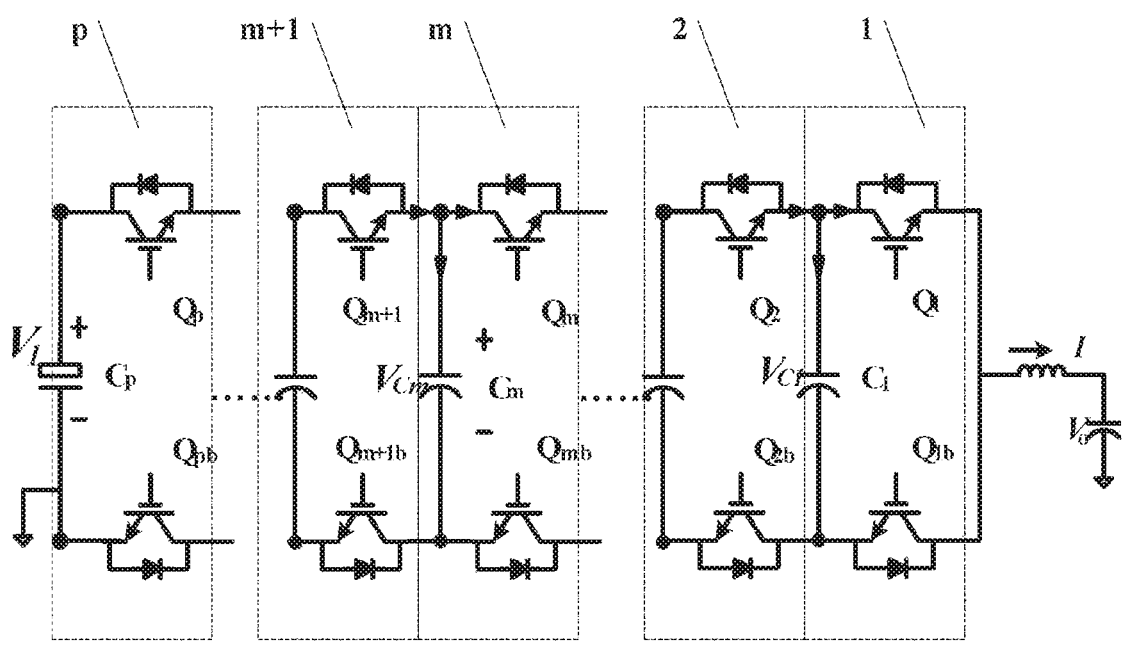
FIG. 7 schematically illustrates a circuit diagram of a multilevel converter, and FIG. 8 schematically illustrates a circuit diagram of a control device applied to the multilevel converter as shown in FIG. 7 according to an exemplary embodiment of the present disclosure.

FIG. 7 illustrates a circuit diagram of a multilevel converter.

Referring to FIG. 7, the flying capacitor multilevel conversion circuit includes a plurality of bridge arms and an inductor L connected in series. Each bridge arm includes an upper semiconductor switch and a lower semiconductor switch connected in series. Taking a bridge arm m as an example, the bridge arm m includes an upper semiconductor switch Qm and a lower semiconductor switch Qmb, and one end of the inductor L is connected to a midpoint of a bridge arm 1. When the circuit under normal operation, the upper semiconductor switch and the lower semiconductor switch of each bridge arm may be complementarily conduction.

When the control device 300 is applied to the flying capacitor multilevel converter as shown in FIG. 7, when a scram state occurred, conduction or turn-off of the upper semiconductor switch and the lower semiconductor switch of each bridge arm may be determined according to the direction and magnitude of the inductor current. For example, when a scram event occurs in the multilevel conversion circuit, the current managing module judges the direction of current of the inductor in the multilevel conversion circuit. The current flowing through each bridge arm is consistent with the inductor current because a plurality of bridge arms are cascaded and connected in series with the inductor L. When the direction of current of the inductor is a first direction, a drive signal generation module turns on the upper semiconductor switch of each bridge arm and turns off the lower semiconductor switch of each bridge. The first direction is a forward conduction direction of the lower semiconductor switch of each bridge arm. Alternatively, when the direction of current of the inductor is a second direction, the upper semiconductor switch of each bridge arm is turned off, and the lower semiconductor switch of each bridge is turned on. The second direction is a forward conduction direction of the upper semiconductor switch of each bridge arm. In addition, as shown in FIG. 8, the control device may further include a plurality of drive modules cascade-connected to the drive signal generation device, including a cascade-connected dead time generation circuit, an isolation circuit, and a semiconductor switch driving circuit.

Figure 8:
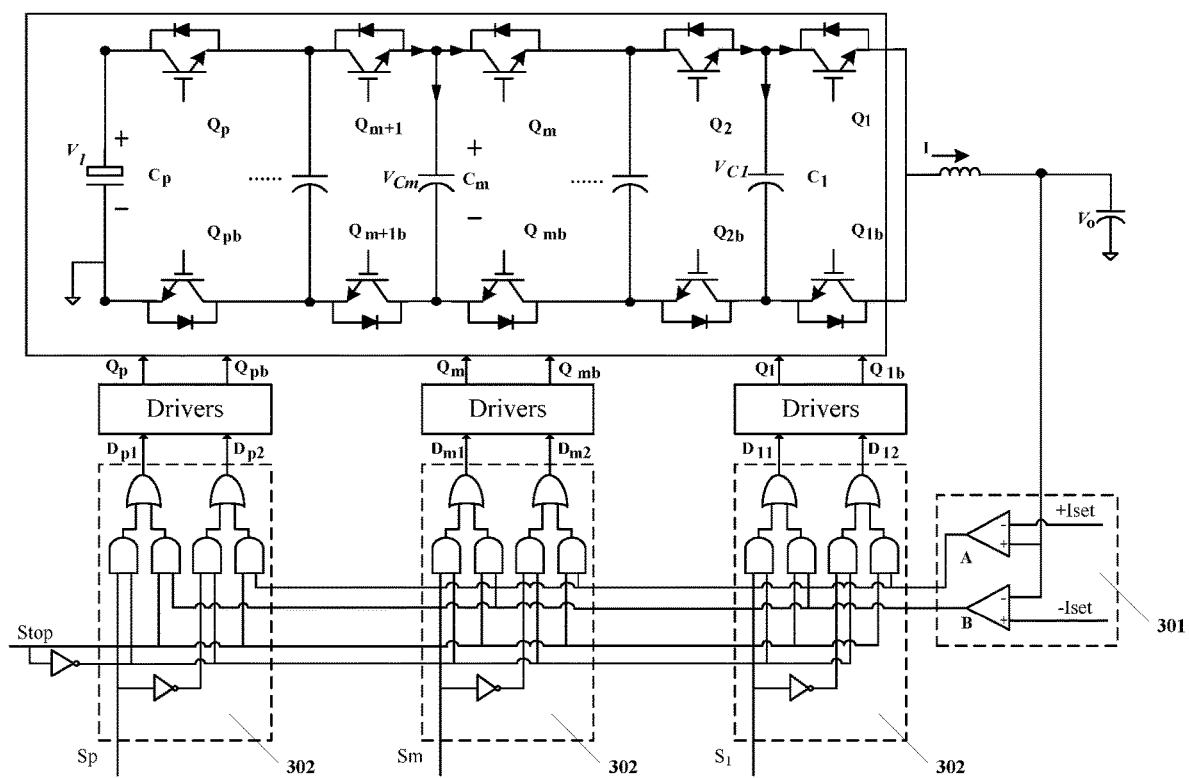

FIG. 8 is a circuit diagram of a control device applied to the flying capacitor multilevel converter according to this exemplary embodiment. As shown in FIG. 8, one current managing unit 301 and a plurality of drive control units 302 are included. The current managing unit 301 and each of the drive control units 302 constitute a plurality of control device 300 to control conduction or turn-off of the upper semiconductor switch and the lower semiconductor switch of each bridge arm. Main contents and principles of the current managing unit 301 and the drive control units 302 have been described in FIG. 3-FIG. 5, and thus are not elaborated herein. In the circuit as shown in FIG. 8, Stop=0 when no scram event occurs, drive signals of all semiconductor switches depends on current comparison signals S1-Sp and has no direct relation with the direction of the inductor current. Stop=1 when a scram event occurs, none of all the current comparison signals S1-Sp has effect on the semiconductor switches, and what directly has effect on control signals of the semiconductor switches includes magnitude and direction of the inductor current.

According to the present disclosure, by providing a link of judging the direction of the inductor current, and by selecting to turn on one semiconductor switch of the conversion circuit according to the direction of the inductor current when a scram event occurs, potential damage to a parasitic diode of the other semiconductor switch by the reverse current generated by the inductor when the scram event occurs is reduced, and the parasitic diode is prevented from generating thermal stress. In addition, by providing a link of detecting the magnitude of current, a false judgment of the direction of current in case of smaller inductor current is avoided. Therefore, the present disclosure may prevent the parasitic diode of the semiconductor switch from suffering relatively large reverse current and conduction loss in the event of a scram event, control the generation of the thermal stress, and protect the semiconductor switch to operate safely and turn off the semiconductor switch in the event of the scram event.

Other embodiments of the present disclosure will be apparent to those skilled in the art from consideration of the specification and practice of the present disclosure disclosed here. This application is intended to cover any variations, uses, or adaptations of the present invention following the general principles thereof and including such departures from the present invention as come within known or customary practice in the art. It is intended that the specification and embodiments be considered as exemplary only, with a true scope and spirit of the present disclosure being indicated by the following claims.

What is claimed is:

1. A control device, applied to a conversion circuit, comprising at least one bridge arm and an inductor, the bridge arm comprising an upper semiconductor switch and a lower semiconductor switch connected in series, and one end of the inductor being connected to a midpoint of the bridge arm, wherein the control device comprises:
    a current managing unit, configured to judge a direction of current of the inductor in the conversion circuit when a scram event occurs in the conversion circuit;
    a drive control unit, configured to turn on the upper semiconductor switch and turn off the lower semiconductor switch when the direction of current of the inductor is judged as a first direction, and turn off the upper semiconductor switch and turn on the lower semiconductor switch when the direction of current of the inductor is judged as a second direction;
    wherein the first direction is a forward conduction direction of the lower semiconductor switch, and the second direction is a forward conduction direction of the upper semiconductor switch,
    wherein the current managing unit comprises:
    a first comparator, configured to compare a current of the inductor with a first reference current and output a first current comparison signal; and
    a second comparator, configured to compare the current of the inductor with a second reference current and output a second current comparison signal; wherein the first reference current and the second reference current are opposite in direction and absolute values of magnitudes thereof are equal to a threshold,
    and wherein the drive control unit comprises:
    a signal inverting circuit, configured to receive an original control signal and output an inversion signal of the original control signal, and receive a scram signal and output an inversion signal of the scram signal; and
    a control signal generating circuit, configured to output a first control signal of the upper semiconductor switch according to the original control signal, the scram signal, the inversion signal of the scram signal and the second current comparison signal, and output a second control signal of the lower semiconductor switch according to the inversion signal of the original control signal, the scram signal, the inversion signal of the scram signal and the first current comparison signal.

2. The control device according to claim 1, wherein the control signal generating circuit comprises:
    a first AND logic gate, configured to receive the original control signal and the inversion signal of the scram signal and output a first output signal;
    a second AND logic gate, configured to receive the scram signal and the second current comparison signal and output a second output signal;
    a first OR logic gate, configured to receive the first output signal and the second output signal and output the first control signal;
    a third AND logic gate, configured to receive the inversion signal of the original control signal and the inversion signal of the scram signal and output a third output signal;
    a fourth AND logic gate, configured to receive the scram signal and the first current comparison signal and output a fourth output signal; and
    a second OR logic gate, configured to receive the third output signal and the fourth output signal and output the second control signal.

3. The control device according to claim 1, wherein the signal inverting circuit comprises:
    a first NOT logic gate, configured to receive the original control signal and output the inversion signal of the original control signal; and
    a second NOT logic gate, configured to receive the scram signal and output the inversion signal of the scram signal.

4. The control device according to claim 1, wherein the drive control unit further comprises a semiconductor switch driving circuit, the semiconductor switch driving circuit is electrically connected to the control signal generating circuit, and the first control signal and the second control signal pass through the semiconductor switch driving circuit to generate a first drive signal driving the upper semiconductor switch and a second drive signal driving the lower semiconductor switch.

* * * * *